United States Patent
Patil et al.

(10) Patent No.: US 10,282,256 B1
(45) Date of Patent: May 7, 2019

(54) SYSTEM AND METHOD TO ENABLE DEDUPLICATION ENGINE TO SUSTAIN OPERATIONAL CONTINUITY

(71) Applicant: Veritas Technologies LLC, Mountain View, CA (US)

(72) Inventors: Deepak Patil, Mountain View, CA (US); Neel Bhatt, Mountain View, CA (US); Stephen Gipp, Mountain View, CA (US)

(73) Assignee: Veritas Technologies LLC, Mountain View, CA (US)

( * ) Notice: Subject to any disclaimer, the term of this patent is extended or adjusted under 35 U.S.C. 154(b) by 165 days.

(21) Appl. No.: 13/918,923

(22) Filed: Jun. 15, 2013

(51) Int. Cl.
G06F 17/30 (2006.01)
G06F 11/14 (2006.01)

(52) U.S. Cl.
CPC .... G06F 11/1453 (2013.01); G06F 17/30156 (2013.01)

(58) Field of Classification Search
CPC .. G06F 3/0641; G06F 11/1453; G06F 3/0608; G06F 3/061; G06F 3/067; G06F 17/30156; G06F 17/30162; G06F 3/0649; G06F 3/0685; G06F 11/1435
See application file for complete search history.

(56) References Cited

U.S. PATENT DOCUMENTS

| | | | |
|---|---|---|---|
| 7,523,098 B2 | 4/2009 | Hirsch | |
| 8,095,756 B1 * | 1/2012 | Somavarapu | G06F 11/1453 711/162 |
| 8,290,972 B1 * | 10/2012 | Deshmukh et al. | 707/758 |
| 8,769,336 B1 * | 7/2014 | Natanzon | G06F 11/1471 714/6.23 |
| 8,782,003 B1 * | 7/2014 | Patterson | G06F 17/30144 707/624 |
| 8,918,372 B1 * | 12/2014 | Guo | G06F 17/30097 707/692 |
| 9,436,697 B1 | 9/2016 | Kulkarni et al. | |
| 2008/0184001 A1 * | 7/2008 | Stager | G06F 3/0608 711/167 |
| 2009/0271402 A1 * | 10/2009 | Srinivasan | G06F 17/3015 |
| 2010/0042790 A1 * | 2/2010 | Mondal | G06F 3/0608 711/161 |
| 2011/0131390 A1 * | 6/2011 | Srinivasan | G06F 3/0622 711/209 |
| 2011/0273982 A1 * | 11/2011 | Akirav et al. | 370/230 |
| 2012/0102003 A1 * | 4/2012 | Bhattacherjee | G06F 17/30445 707/692 |

(Continued)

OTHER PUBLICATIONS

Oracle, "Oracle Communications Service Broker," Online Mediation Controlloer Implementation Guide, Mar. 2012, Release 6.0. Redwood City, CA, USA.

*Primary Examiner* — James Trujillo
*Assistant Examiner* — Hubert Cheung
(74) *Attorney, Agent, or Firm* — Patent Law Works LLP

(57) ABSTRACT

A method for backing up data is provided. The method includes deduplicating a first plurality of data units during a backup operation through application of a first deduplication service and a fingerprint database. The method includes logging a second plurality of data units in a journal, during the backup operation. The logging is in response to a failure of the first deduplication service and wherein at least one method operation is executed through a processor.

17 Claims, 5 Drawing Sheets

(56) References Cited

U.S. PATENT DOCUMENTS

| | | | |
|---|---|---|---|
| 2012/0158670 A1* | 6/2012 | Sharma | G06F 3/0608 |
| | | | 707/692 |
| 2013/0086007 A1* | 4/2013 | Bandopadhyay | ............................ |
| | | | G06F 17/30156 |
| | | | 707/692 |
| 2013/0262805 A1* | 10/2013 | Zheng | G06F 3/0641 |
| | | | 711/162 |
| 2014/0047202 A1* | 2/2014 | Vellore et al. | 711/162 |
| 2014/0201171 A1* | 7/2014 | Vijayan | G06F 17/30156 |
| | | | 707/692 |
| 2014/0281216 A1* | 9/2014 | Danilak | 711/113 |

* cited by examiner

Fig. 5

| FINGERPRINT IDENTIFIER | FINGERPRINT | STORAGE IDENTIFIER | DATA UNIT IDENTIFIER |
|---|---|---|---|
| 1 | ... 00110 | DISK 5 | ... 99 |
| 2 | ... 10010 | DISK 2 | ... 07 |
| ... | | | |
| N | ... 01011 | DISK 4 | ... 12 |

SYSTEM AND METHOD TO ENABLE DEDUPLICATION ENGINE TO SUSTAIN OPERATIONAL CONTINUITY

CROSS REFERENCE TO RELATED APPLICATION

This application is related to U.S. application Ser. No. 13/918,922 entitled "System and Method for Operational Continuity of Backup Operations to a Deduplicated Storage," which is incorporated herein by reference for all purposes.

BACKGROUND

Large amounts of documents, files and other forms of data are being produced and managed on computer systems worldwide, every day. Backup systems, backup storage and backup algorithms are in use in many of these computer systems, at consumer, commercial and institutional levels. Backups allow recovery from crashes, in which data would otherwise be lost were it not for the existence of backup copies of the data. Data deduplication improves efficiency of many aspects of backing up, by eliminating redundant copies of data in the backup storage. Storage efficiency is thus improved, as space that would be occupied by redundant copies of the data can be used for storing additional data. In addition, backup time is reduced as the time that would have been spent storing redundant copies of the data is eliminated. Data deduplication can be performed as a post-processing operation to eliminating redundant copies through selective deletion after the data is stored or in the alternative data deduplication can be performed prior to storage.

Whether performed as a pre-processing or post-processing operation, many if not most deduplication systems and algorithms make use of fingerprints of data units. These fingerprints allow comparison with a newly generated fingerprint of a newly arriving data unit. The fingerprint comparison proceeds much more quickly than one-to-one comparison of the data units themselves. However, corruption in a fingerprint database or disruption of communication between a processor and a fingerprint database can cause a backup system to malfunction and even become inoperable. An incomplete backup can leave a computer system vulnerable to irrecoverable failure.

It is within this context that the embodiments arise.

SUMMARY

In some embodiments, a method for backing up data is provided. The method includes deduplicating a first plurality of data units during a backup operation through application of a first deduplication service and a fingerprint database. The method includes logging a second plurality of data units in a journal, during the backup operation. The logging is in response to a failure of the first deduplication service and wherein at least one method operation is executed through a processor.

In some embodiments, a non-transient, tangible, computer-readable media having instructions thereupon which, when executed by a processor, cause the processor to derive a first plurality of deduplicated data units from a first plurality of data units via a first deduplication process and a fingerprint database, during a backup operation. The instructions further cause the processor to store the first plurality of deduplicated data units in a backup storage, during the backup operation and to store a second plurality of data units in the backup storage during the backup operation, in response to a failure of the first deduplication process. The instructions cause the processor to store in a journal a history of storing the second plurality of data units in the backup storage.

In some embodiments, a data backup system is provided. The data backup system includes a backup storage and a fingerprint database. The data backup system includes a first deduplication engine configured to execute a first deduplication process. The first deduplication process deduplicates first data units via comparison of fingerprints of the first data units to fingerprints in the fingerprint database. The first deduplication engine stores deduplicated first data units in the backup storage. The data backup system includes a journal and a second deduplication engine configured to execute a second deduplication process. The second deduplication process stores second data units in the backup storage. The second deduplication process logs fingerprints of the second data units into the journal. The second deduplication process is idle while the first deduplication process deduplicates. The second deduplication process is active in storing data units during a condition of failure of the first deduplication process to deduplicate.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is an example of a fingerprint table, which can be used in the systems of FIGS. 1-3 and the method of FIG. 4 in accordance with some embodiments.

DETAILED DESCRIPTION

Figure 1:
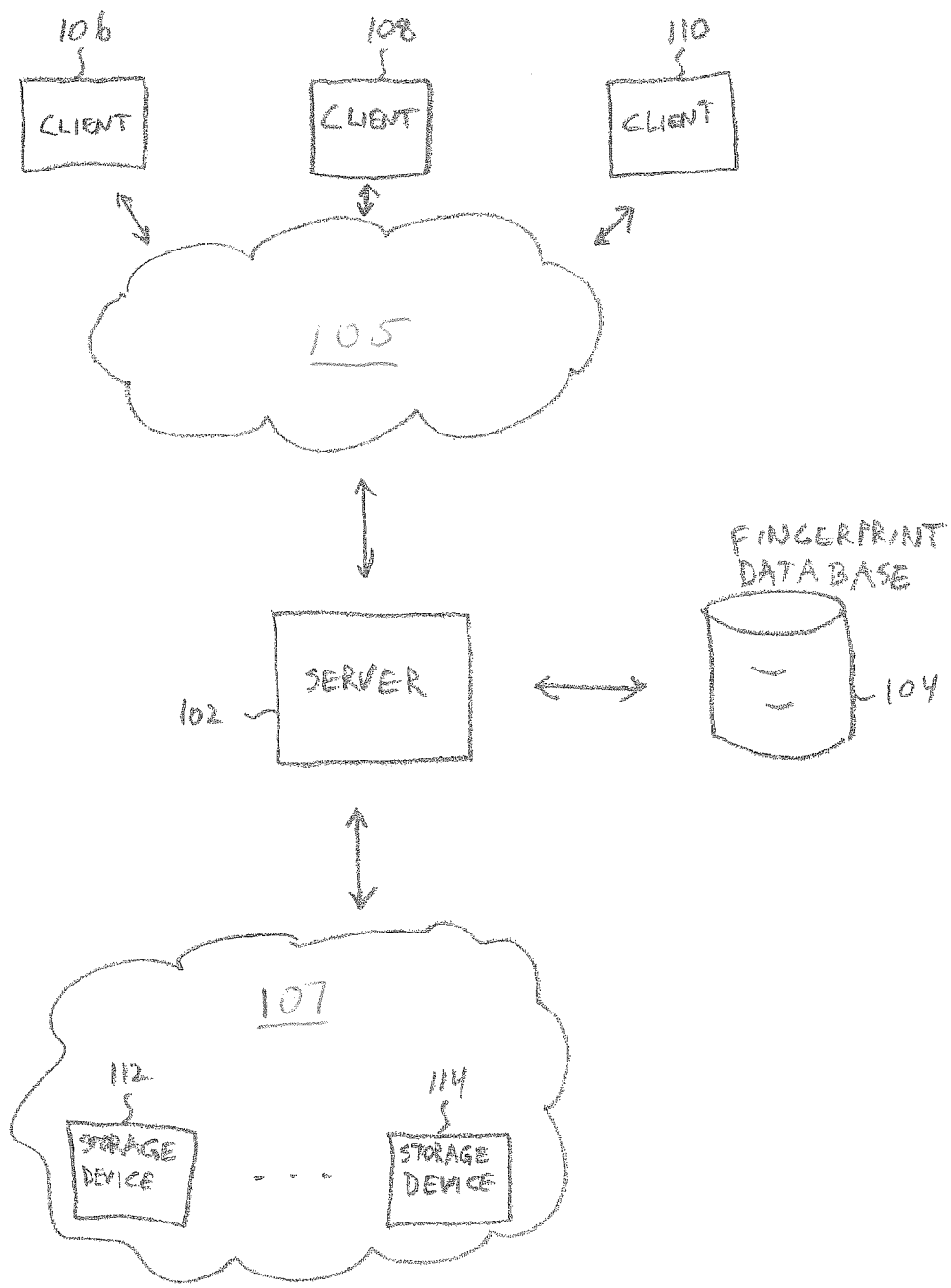
FIG. 1 is a schematic diagram of a data backup system, which uses a fingerprint database during data deduplication in accordance with some embodiments.

A data backup system and related method perform data deduplication while a fingerprint database is available where the deduplicated data is stored in backup storage. If the fingerprint database becomes unavailable during a backup run or backup session, the system and method continue to store data in the backup storage through the embodiments described below. Thus, data is backed up whether or not the fingerprint database is available. The fingerprint database may be provided as a web service in some embodiments and can become unavailable due to numerous reasons. The embodiments described herein allow a backup to be completed under circumstances where the fingerprint database is reliably available, intermittently unavailable, intermittently available, or constantly unavailable.

One version of the data backup system operates by turning on and off deduplication, depending on whether or not the fingerprint database is available. Another version of the data backup system has two deduplication engines. The first deduplication engine operates with the fingerprint database, and the second deduplication engine operates with a journal which is available even if the fingerprint database is not. The second deduplication engine is activated when the first deduplication engine fails to deduplicate, as may occur when the fingerprint database is unavailable, e.g., if there is some failure of the first deduplication engine. During recovery, the journal facilitates reconciliation of the fingerprint database and the backup storage so data continues to be backed up in the event of the fingerprint data base becoming unavailable.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 shows a server 102 that performs backups for any or all of the clients 106, 108, 110. Backup data is stored in one or more of the storage devices 112, 114. In order to perform data deduplication, the server 102 accesses a fingerprint database 104 through a network connection. In the example shown, the clients 106, 108, 110 are coupled to the server 102 via a network 105, and the server 102 is coupled to the storage devices 112, 114 via another network 107. In some embodiments network 107 may be a storage area network or network attached storage. The server 102 could be coupled to the fingerprint database 104, i.e., coupled to a memory in which the fingerprint database is stored, in any of a variety of ways. Coupling could be via a network, through a local coupling, or through an internal coupling. One example of an internal coupling is where the fingerprint database is stored on a memory internal to the server 102. The above-described networks could be combined, or further networks could be used, etc. The fingerprint database 104 could be provided as a web service or a cloud service in some embodiments. Other arrangements and couplings for the server 102, the clients 106, 108, 110, the fingerprint database 104, and the storage devices 112, 114 are readily devised.

When performing a backup with deduplication, the server 102 checks the fingerprint database 104. Data that has been previously handled by the server 102 and stored in one of the storage devices 112, 114 already has a fingerprint in the fingerprint database 104. For newly arriving data that is to be backed up, the server 102 obtains or generates a fingerprint of the newly arriving data. The fingerprint could accompany the data, the server 102 could generate the fingerprint, or the server 102 could obtain the fingerprint from another device or service. The algorithm for generating the fingerprint may be any known algorithm commonly utilized for fingerprint generation. This fingerprint is then compared with fingerprints in the fingerprint database 104. The comparison could be performed by the server 102, or could be performed on a query basis with another server that handles the fingerprint database 104. If no match is found, the server 102 sends the data onward to one or more of the storage devices 112, 114, and the data is stored in that backup storage, i.e., the server 102 stores the data in the storage devices 112, 114. The server 102 writes the fingerprint to the fingerprint database 104, shortly before, while, or shortly after the data is sent to the storage devices 112, 114. It should be appreciated that if a match is found, the data is not sent onward to the storage devices 112, 114, as doing so would be storing redundant data. In this manner, the data is deduplicated prior to storage in a backup storage.

Figure 2:
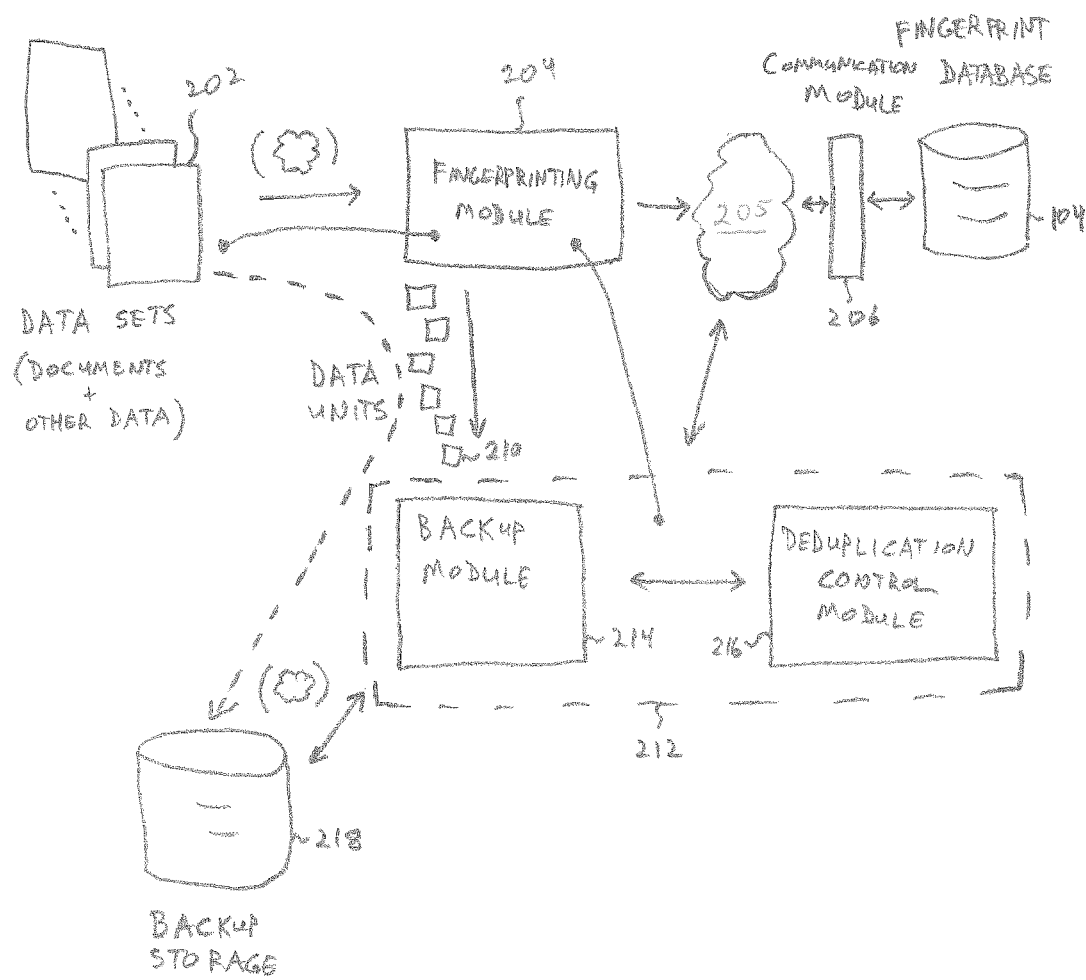
FIG. 2 is a schematic diagram of a data backup system, with details regarding data sets, data units, fingerprinting and deduplication in accordance with some embodiments.

FIG. 2 shows an embodiment of the data backup system, in more detail than FIG. 1. The data backup system of FIG. 2 performs backup with deduplication while the fingerprint database 104 is available or accessible, and continues performing backup even when the fingerprint database 104 becomes unavailable or inaccessible during the same backup run or backup session. As shown by the dashed-line arrow, the data backup system stores selected data units 210, from data sets 202, in backup storage 218. The system accesses the data sets 202 in any of a variety of ways. For example, the data sets 202 could be accessed by a network, shown in FIG. 2 as a cloud in parentheses (to indicate various types of access connections are possible in various embodiments), or the data sets 202 could be accessed via a local connection, an internal connection or other connections as readily devised.

Still referring to FIG. 2, a fingerprinting module 204 segments or decomposes the data sets into data units 210. In some embodiments, the data sets are provided as previously broken up or segmented into data units. For example, a data set could include one or more files, documents or other types of data, of which the data units 210 are a subset. As a further example, a document could be broken up or decomposed into paragraphs or other units of smaller granularity than the entire file or document. The paragraphs or other units would then be the data units 210. Alternatively, the data units 210 could be the same size as the files, documents or other types of data. It is possible that data units 210 could be groups of files, documents or other types of data. The size of the data unit 210 and the definition of the data unit 210 may be implementation dependent. It should be appreciated that a data unit could be one or more files or documents, or smaller than the file size or document size. In some embodiments a data unit could be a fixed size block or a variable sized block.

Continuing with FIG. 2, for each data unit 210, the fingerprinting module 204 derives or generates a fingerprint. The fingerprinting module 204 makes the fingerprint available to the fingerprint database 104 and/or to a deduplicating backup module 212. The fingerprinting module 204 may apply a known fingerprinting algorithm or may use a proprietary fingerprinting algorithm. A fingerprinting algorithm maps a larger chunk of data to a smaller piece of data, such as a string in some embodiments. The smaller piece of data is the fingerprint, or is part of the fingerprint, for the larger chunk of data, and serves with high probability to uniquely identify the larger chunk of data. For example, a hashing algorithm, a cryptographic algorithm or a cryptographic-grade hashing algorithm could be used in the fingerprinting module 204 to derive or generate a fingerprint.

The fingerprinting module 204 of FIG. 2 is in various locations in various embodiments of the system. Some of these membership possibilities are shown in FIG. 2 as lines with dots at both ends, indicating the fingerprinting module 204 could belong to or be integrated with a member at the location of the dot. In one embodiment, the fingerprinting module 204 is included in a source of the data sets 202. In another embodiment, the fingerprinting module 204 is included in a source of the data units 210. In these embodiments, the data units are provided along with fingerprints. For example, the backup system could receive data sets that are previously broken up into data units 210, and a fingerprint could accompany each data unit 210. In one embodiment, the fingerprinting module 204 is accessible through a network connection and is provided on a host, which differs from the host that provides the deduplicating backup module 212. In yet another embodiment, the fingerprinting module 204 is included in the deduplicating backup module 212. For example, one or more modules could be implemented using one or more specially programmed processors, in a stand-alone computer, in a server, in a group of computers or servers, and so on. These could be local or combined, or distributed, or connected via one or more networks.

The deduplicating backup module 212 in FIG. 2 performs backups by storing selected data units 210 in a backup storage 218. The selection process, by which the data units 210 are selected for storage, depends on whether or not the fingerprint database 104 is available for use in deduplication. The backup storage 218 can include one or more hard drives, one or more readable/writable optical discs, or other types of storage memory. In one embodiment, the backup storage 218 is accessed via a local connection. In another embodiment, the backup storage 218 is accessed via a network, shown as a cloud in parentheses. Other types of access and connections or couplings are readily devised.

As shown in FIG. 2, the deduplicating backup module 212 includes a backup module 214 and a deduplication control module 216. In another embodiment, the deduplicating backup module 212 is an integrated unit which performs the functions of both the backup module 214 and the deduplication control module 216. The backup module 214 performs the functions of backing up the data units 210. These functions include storing or directing the storage of the selected data units 210 in the backup storage 218. The deduplication control module 216 performs the deduplication functions. These functions include directing the selection of which ones of the data units 210 should be sent on to storage in the backup storage 218. The deduplication control module 216 directs the backup module 214 as to whether or not a backup of a data unit includes deduplication. The backup module 214 can then store deduplicated data units 210 or non-deduplicated data units 210 in the backup storage 218, as directed by the deduplication control module 216.

Still referring to FIG. 2, a communication module 206 provides and controls access to the fingerprint database 104, for example via a network 205. In further embodiments, the fingerprint database 104 is accessed via other types of modules, buses, networks or connections. In some embodiments, the fingerprint database 104 would be accessible or available to the deduplicating backup module 212 with 100% reliability. However, in real-world applications, a variety of failures can occur, especially for hosted applications and/or web services. The communication module 206 could experience a hardware or software failure and crash, a network could go down, a communication channel could be closed or malfunctioning, a website hosting the fingerprint database 104 could be down, some other connection to the fingerprint database 104 could be down, the fingerprint database 104 could be off-line for maintenance or as a result of failure, and so on. In embodiments where coupling to the fingerprint database 104 is via a network connection, unavailability of the fingerprint database 104 could be indicated by an error message such as "host not found" or "error:" accompanied by some error code number. In another embodiment, where the fingerprint database 104 is internal to the system and access is based upon a request, an internal access to the fingerprint database 104 might not be granted for various reasons. Alternatively, the fingerprint database 104 could be corrupted, perhaps as a result of a software bug or hacking. Because of these or other possible situations, in the real world the fingerprint database 104 is likely to be less than 100% reliable and will likely be unavailable or inaccessible some of the time. Similar factors affect many complex electronic systems, especially enterprise databases, distributed systems and networked systems. The deduplicating backup module 212 described herein is designed with fault tolerance so as to continue operating whether or not the fingerprint database 104 is available as detailed further below.

For each arriving data unit 210, the deduplicating backup module 212 compares the fingerprint of the data unit 210 to existing fingerprints in the fingerprint database 104 and determines whether the fingerprint has a match in the fingerprint database 104. The deduplicating backup module 212 can do this when the fingerprint database 104 is available or accessible. For example, the deduplication control module 216 could receive the fingerprint from the fingerprinting module 204, and send the fingerprint to the communication module 206 along with a query to ask if the fingerprint has a match in the fingerprint database 104. In the alternative, the fingerprinting module 204 could send the fingerprint directly to the communication module 206, which would then send an indication of a match or no match to the deduplication control module 216. The fingerprinting module 204 may request a range of fingerprints be returned from the communication module 206, and perform a comparison check directly in some embodiments. Other techniques for the deduplication control module 216 or the deduplicating backup module 212 to perform the determination or the comparison are readily devised. A match is found if the fingerprint matches one of the existing fingerprints in the fingerprint database 104. If there is no match of the fingerprint to the existing fingerprints in the fingerprint database 104, the deduplication control module 216 directs the backup module 214 to send the selected data unit 210 onward to the backup storage 218. The data unit 210 is then stored in the backup storage 218.

If there is a match of the fingerprint to one of the existing fingerprints in the fingerprint database 104, the deduplication control module 216 does not direct the backup module to send the data unit 210 to the backup storage 218. In some embodiments, the deduplication control module 216 directs the backup module to not send the data unit 210 to the backup storage 218. In this situation, where there is a match, the data unit 210 is not stored in the backup storage 218 as a backup copy, because a previous copy of the data unit 210 is already stored in the backup storage 218. This previous copy of the data unit 210 is indicated by the existence of the matching fingerprint in the fingerprint database 104, where the existing fingerprint was stored into the fingerprint database 104 from a previous storage event. In response to the indication of the match of the fingerprint to the fingerprint database, the deduplication control module 216 stores an entry in the fingerprint database 104. In a further embodiment, this entry is stored in another database or another memory. This entry, wherever stored, is linked to the matching fingerprint in the fingerprint database 104, and links the data unit to a data set from which the data unit originates. The entry can be used if data is restored from backup storage 218 to a system, for example after such a system experiences a system crash or memory crash. The entry is used when a copy of the original data set is reassembled from backup-stored data units, as pointed to by fingerprints and entries made by the deduplication control module 216.

If the deduplication control module 216 attempts to compare a fingerprint of an arriving data unit 210 to existing fingerprints in the fingerprint database 104, and finds the fingerprint database 104 is unavailable, operation nonetheless continues. The deduplication control module 216 then directs the backup module 214 to send the data unit 210 onward to the backup storage 218, to store the data unit 210. Under circumstances where the fingerprint database 104 is unavailable, the backup module 214 can then store non-deduplicated data units 210. In various embodiments, the deduplication control module 216 could make a single attempt to communicate with the fingerprint database 104, or could make multiple attempts. In some embodiments, the deduplication control module 216 retries the communication or comparison attempt until a predetermined number of retries has occurred. In another embodiment, the deduplication control module retries the communication or comparison attempt until a predetermined timeout interval has occurred. The predetermined number of retries or the timeout interval could be implementation dependent or user-specified. If, during the retry attempts, the fingerprint database 104 becomes available, i.e., access to the fingerprint database 104 becomes operational, the deduplication control module 216 can then direct storage of deduplicated data units 210 as described above. If, during the retry attempts, the fingerprint database 104 remains unavailable, i.e., access to the fingerprint database 104 is nonoperational, the deduplication control module 216 can then direct storage of non-deduplicated data units 210 as described above. In one embodiment, a retry is based upon an error message. For example, if one type of error message is received, indicating unavailability of the fingerprint database 104, retry is attempted immediately. If another type of error message is received, retry is attempted after a period of time. If yet another type of error message is received, a predetermined number of retries are attempted in succession or retries are attempted for a time. If one type of error message is received, no retry is attempted. In this manner, a backup operation can be of entirely deduplicated data units with application of a reliably available fingerprint database 104, of entirely non-deduplicated data units as a result of an unavailable fingerprint database 104, or of mixed deduplicated and non-deduplicated data units as a result of an intermittently available fingerprint database 104.

Continuing with FIG. 2, the deduplicating backup module 212 can operate in a pipelining or batch mode in some embodiments. For example, in one embodiment, the deduplication control module 216 pipelines the fingerprint match requests to the fingerprint database 104 and the backup module 214 pipelines the selection and storage of data units 210. As indications of match or no match return from the fingerprint database 104, the deduplication control module 216 directs the backup module 214 to include or not include a specified data unit 210 in the pipeline of data units 210 to the backup storage 218. Specifically, a data unit 210 which is not going to be stored in the backup storage 218 could be removed from a pipeline of data units 210, or not inserted into the pipeline. In another embodiment, the data units could be readied for a batch write to the backup storage 218, before, while or after the deduplication control module 216 prepares and sends a batch of fingerprints or directs the fingerprinting module 204 to send a batch of fingerprints for matching to the fingerprint database 104. Alternatively, the deduplication control module 216 could request a batch of fingerprints from the fingerprint database 104, and the deduplication control module 216 could perform a local comparison with a batch of recently arrived fingerprints. In yet another embodiment, a plurality of deduplicated data units is derived from a plurality of data units, as a result of the fingerprint database 104 being accessible. These deduplicated data units include only the data units that lack a match in the fingerprint database. This could be accomplished using pipelining or batch modes or other suitable modes. In some embodiments, the backup module 214 applies compression to data units 210. The compression could be applied after the data units are deduplicated, and before the data units are stored in the backup storage. This may be more efficient than applying compression before data units are deduplicated or after data units are stored in the backup storage, although such could be done in further embodiments. In another embodiment, compression is applied to data units 210 even when the fingerprint database 104 is unavailable.

Figure 3:
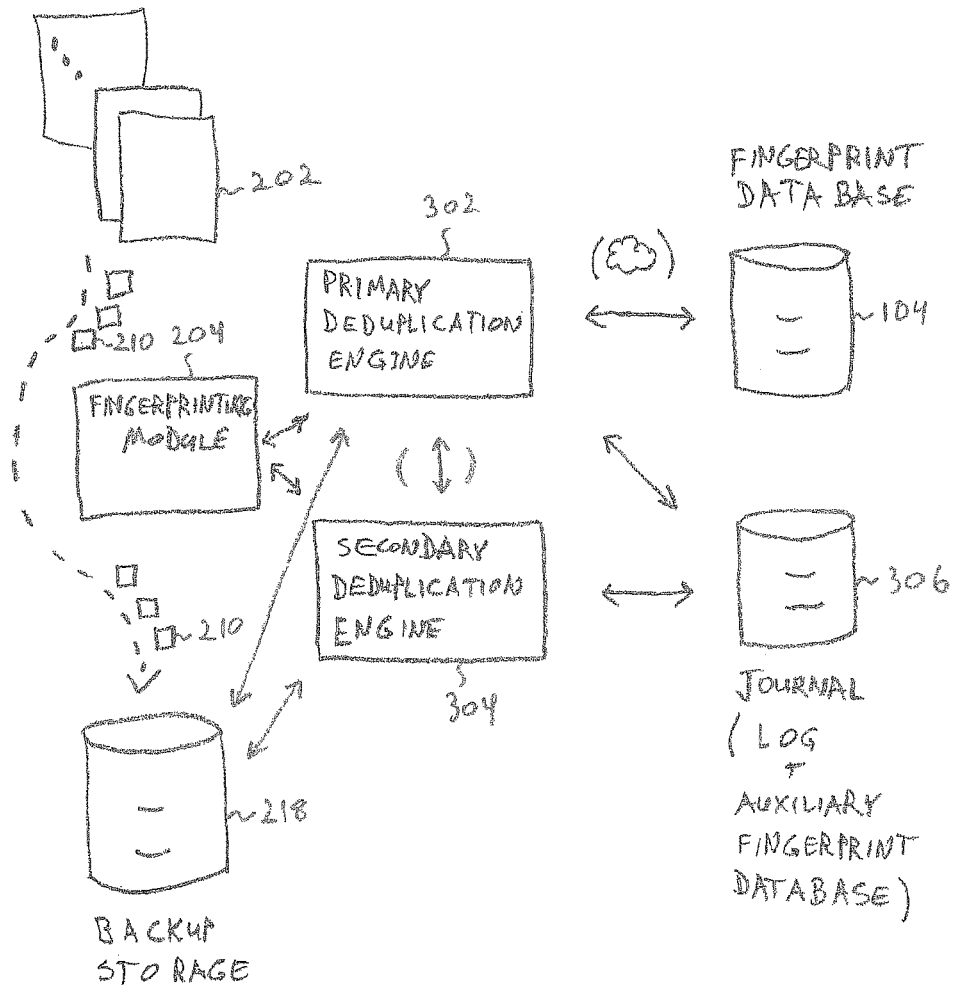
FIG. 3 is a schematic diagram of a data backup system, with two deduplication engines and a journal in accordance with some embodiments.

FIG. 3 shows another embodiment of a data backup system. In this embodiment, a primary deduplication engine 302 and a secondary deduplication engine 304 are available for backing up data units 210. As with the backup system of FIG. 2, data sets 202 are segmented or decomposed into data units 210. The data backup system then deduplicates the data units 210 through the primary deduplication engine 302. Deduplicated data units 210 are stored in the backup storage 218. The primary deduplication engine 302 makes use of the fingerprint database 104. The secondary deduplication engine 304 takes over, i.e., is activated for backing up data units 210, if or when the primary deduplication engine 302 fails. In some embodiments, the secondary deduplication engine 304 writes log entries into a journal 306 while backing up the data units 210. The journal 306 logs a history of operation while the secondary deduplication engine 304 is active, for later use during recovery. For example, the journal 306 could record the fingerprints of data units 210 written to the backup storage 218 along with timestamps for when the writing takes place. The journal 306 could record filenames and file paths from which the data units 210 originated, for reconstruction of files during a recovery. The above information could be recorded in the journal 306 in the form of a sequential series of entries, a table, or a relational or other type of database, and the journal 306 could be formatted as a single file or multiple files with links or in a directory structure. Fingerprints and timestamps could be associated with one another directly or through the use of pointers, and organized into an auxiliary fingerprint database or a log, or both, which could be included in the journal 306. In alternative embodiments, the secondary deduplication engine 304 writes log entries and fingerprints into the journal 306 while deduplicating and backing up the data units 210. In yet other embodiments, the secondary deduplication engine 304 determines whether to solely log entries or to log entries and deduplicate, while backing up the data units 210.

Continuing with FIG. 3, if or when the primary deduplication engine 302 is ready to resume service, a recovery takes place. The recovery makes use of the journal 306, and updates or reconciles the fingerprint database 104 and the backup storage 218. After the recovery is complete, the primary deduplication engine 302 can resume normal operation. The embodiment in FIG. 3 can be implemented as part of one of the embodiments in FIGS. 1 and 2 or as a variation thereof, as will be described below. The primary deduplication engine 302 communicates with the fingerprint database 104 over a connection, which can be local, or network-based (as shown by the cloud in the parentheses), or through another type of connection as readily devised in various embodiments. In some embodiments, the primary deduplication engine 302 and the secondary deduplication engine 304 are isolated from each other and do not communicate with each other, however, in other embodiments the primary deduplication engine 302 and the secondary deduplication engine 304 may communicate with each other in a manner that allows the secondary deduplication engine to operate even when there is structural damage in the fingerprint data base (as shown by the double headed arrow in the parentheses, indicating possible connection or lack thereof in various embodiments).

The primary deduplication engine 302 has two modes of operation, a normal mode and a recovery mode in some embodiments. In normal mode, the primary deduplication engine 302 receives fingerprints from the fingerprinting module 204 and stores or directs storage of the associated data units 210. Each fingerprint is checked for a match in the fingerprint database 104. If a match is found in the fingerprint database 104, the primary deduplication engine 302 stores an entry in the fingerprint database linking the matching fingerprint in the fingerprint database 104 to the data unit 210 and the data set 202 from which the data unit 210 originates. The data unit 210 is not then newly stored in the backup storage 218, since a previously stored copy of the data unit 210 is already in the backup storage 218. The existence of such a previously stored copy of the data unit 210 is indicated by the matching fingerprint in the fingerprint database 104. If a match is not found in the fingerprint database 104, the primary deduplication engine 302 stores the fingerprint in the fingerprint database 104 and stores the data unit 210 in the backup storage 218. The fingerprint database 104, if sufficiently large, would contain a fingerprint for every data unit 210 that is stored in the backup storage 218. However, in some versions, fingerprints may be purged from the fingerprint database 104 or overwritten by more recently stored fingerprints, so that the fingerprint database 104 contains a representative set of fingerprints for the data units 210 in the backup storage 218, but not necessarily all fingerprints.

In some embodiments, the primary deduplication engine 302 of FIG. 3 runs or executes a first deduplication service or process. The primary deduplication engine 302 derives deduplicated data units via the first deduplication process and the fingerprint database 104. The first deduplication process can be implemented as a process executing on a specially programmed processor, or in various combinations of software, hardware and firmware. For similar reasons as discussed regarding the modules and the backup storage system of FIG. 2, the first deduplication service or the primary deduplication engine 302 may not be 100% reliable and may fail. For example, if the fingerprint database 104 is unavailable, the first deduplication service could halt or crash, and/or the primary deduplication engine 302 could cease deduplicating data units 210. The first deduplication service could be off-line for a matter of seconds, minutes, hours or days.

Still referring to FIG. 3, should the first deduplication service be off-line, the secondary deduplication engine 304 takes over the backup operation. The secondary deduplication engine 304 runs a second deduplication process or service. The second deduplication process performs backup, and includes deduplication in some embodiments and not in others. The secondary deduplication engine 304 may be unable to add or remove references from existing containers if these containers are not part of the journal 306. In such a case, data units could be written again in new containers, which could impact deduplication rates. Any new fingerprints that are added to the journal 306, by the secondary deduplication engine 304, can be looked up for deduplication once the main service is back online and processes the journal 306. The second deduplication process is idle, or off, while the primary deduplication engine 302 is operating correctly, i.e., the first deduplication process is not failed. In some embodiments, the secondary deduplication engine 304 or the second deduplication process is polling the first deduplication engine to determine whether a condition of failure of the first deduplication service is true or false. In other embodiments, the secondary deduplication engine 304 or the second deduplication process is deactivated unless the first deduplication process fails a heartbeat check. In some embodiments, the first deduplication process and the second deduplication process are on separate threads in a multi-threaded system. In these embodiments, the second deduplication process monitors the first deduplication process thread. It should be appreciated that the processes could be implemented on different processors, e.g., in a multiprocessing system, a distributed system, or a multi-server system. In another embodiment, the second deduplication process is activated by an interrupt, where the interrupt is issued upon failure of the first deduplication process. In yet another embodiment, the first deduplication process regularly resets a timeout timer and the second deduplication process monitors the timeout timer. A service request could be generated when the second deduplication process is activated, alerting personnel of a need to service, reconnect to or otherwise bring back online the primary deduplication engine 302 or the fingerprint database 104. These and other mechanisms for activating the second deduplication process, and enabling the secondary deduplication engine 304 to backup data units 210 in case of failure of the first deduplication process or the primary deduplication engine 302, can be integrated into the secondary deduplication engine 304. Such mechanisms can operate while the secondary deduplication engine 304 is idle, i.e., while the secondary deduplication engine 304 is not actively backing up or deduplicating (as specific to an embodiment).

Continuing with FIG. 3, the primary deduplication engine 302 and the secondary deduplication engine 304 are designed so that the first deduplication process and the second deduplication process can perform backup operations during the same backup run in some embodiments. In other embodiments the first deduplication process and the second deduplication process do not perform backup operations at the same time. In yet other embodiments, a single backup run has to complete on either of the two deduplication engines 302 or 304. The second deduplication process is idle or off, i.e., not performing a backup, while the first deduplication process is performing deduplicating backup. The second deduplication process is active, i.e., performing a backup, while the first deduplication process is halted, crashed, malfunctioning or otherwise failed. Since, in a case where the primary deduplication engine 302 or the first deduplication process has failed, it is possible the fingerprint database 104 is unreliable, corrupted or otherwise unavailable, the secondary deduplication engine 304 is designed to operate without relying on the fingerprint database 104. In some embodiments, the secondary deduplication engine 304 is designed to not communicate with the fingerprint database 104. Instead of the fingerprint database 104, the secondary deduplication engine 304 makes use of the journal 306. In various embodiments, the secondary deduplication engine 304 writes log entries into the journal 306 before, during, or after the secondary deduplication engine 304 stores data units 210 in the backup storage 218. In some embodiments, the data units 210 are not deduplicated by the secondary deduplication engine 304, but are logged by the secondary deduplication engine 304 for possible later deduplication by the primary deduplication engine 302. Whether or not the primary deduplication engine 302 later deduplicates these data units 210 is implementation or situation dependent.

In some embodiments, the secondary deduplication engine 304 of FIG. 3 deduplicates the data units 210 via application of the journal 306. Each time a data unit 210 and associated fingerprint is received, the secondary deduplication engine 304 checks to see if there is a match for the fingerprint in the journal 306. In the embodiment shown, the journal 306 includes a log and an auxiliary fingerprint database. More specifically, the secondary deduplication engine 304 checks to see if there is a match for the fingerprint in the auxiliary fingerprint database. If there is no match, the secondary deduplication engine 304 stores the data unit 210 in the backup storage 218, and stores the fingerprint in the auxiliary fingerprint database. The secondary deduplication engine 304 also makes a log entry in the log, in some embodiments. This entry indicates the data unit was added to the backup storage because a match to the fingerprint was not found in the auxiliary fingerprint database. If there is a match in the auxiliary fingerprint database, the secondary deduplication engine 304 does not then newly store the data unit 210 in the backup storage 218, as the matched fingerprint indicates there is already a previously stored copy of the data unit 210 in the backup storage 218. This previously stored copy of the data unit 210 was earlier stored in the backup storage by the second deduplication service, which is how the fingerprint was placed in the auxiliary fingerprint database, i.e., in the journal 306. The secondary deduplication engine 304 makes a log entry in the log, linking the existing fingerprint in the auxiliary fingerprint database to the data unit 210 and the data set 202 from which the data unit 210 originates. This entry indicates a match was found in the auxiliary fingerprint database and the data unit was not added to the backup storage. Deduplication continues in this manner, with the secondary deduplication engine 304 deriving deduplicated data units and making use of the journal 306 to log a history of operation for later use during recovery.

When or if the primary deduplication engine 302 of FIG. 3 is ready to resume normal operation, a recovery process is initiated. The recovery process could be part of resumption of the first deduplication service, i.e., bringing the first deduplication service back online, following the failure of the first deduplication service. Or, the recovery process could be a separate process, which is initiated, run and completed prior to activating the first deduplication service in a normal mode. During the recovery, the primary deduplication engine 302 consults or accesses the journal 306 and updates or reconciles the fingerprint database 104 and the backup storage 218. The primary deduplication engine 302 does so by checking entries in the log and checking fingerprints in the auxiliary fingerprint database in some embodiments. For each fingerprint, if the fingerprint does not already exist in the fingerprint database 104, the fingerprint is added to the fingerprint database 104. The fingerprint database 104 is also updated as to links that the secondary deduplication engine 304 established in the journal 306, namely links among fingerprints, data units 210 and data sets 202.

Still referring to FIG. 3, in some embodiments, the primary deduplication engine 302 further deduplicates the data in the backup storage 218 during the recovery. The primary deduplication engine 302 does so by further deduplicating data units 210 that were stored by the secondary deduplication engine 304. For example, the first deduplication process could have deduplicated a first set of data units via application of the fingerprint database 104, storing a first deduplicated set of data units in the backup storage 218. In one embodiment, the second deduplication process could have deduplicated a second set of data units via application of the auxiliary fingerprint database and the journal 306, storing a second deduplicated set of data units in the backup storage 218. However, since the secondary deduplication engine 304 could not make use of the fingerprint database 104, this operation could have stored redundant data units 210 in the backup storage 218. These redundant data units 210 would have been deleted, i.e., not have been stored, had the first deduplication process done the deduplication, rather than the second deduplication process. During recovery, the primary deduplication engine 302 can consult the journal 306 and further deduplicate the second deduplicated set of data units in the backup storage 218, by selectively deleting the redundant data units 210. In the embodiments where the second deduplication engine 304 solely logs entries but does not deduplicate, the primary deduplication engine 302 can deduplicate the non-deduplicated data units 210 that the second deduplication engine 304 stored in the backup storage 218.

When the recovery process is complete, the primary deduplication engine 302 and the first deduplication service or process can resume normal operation and continue deduplicating data units 210 as described above. The primary deduplication engine 302 continues storing deduplicated data units 210 in the backup storage 218, until the backup run is complete. A backup run is complete when all of the data sets 202 specified at the beginning of the backup run have been backed up, with deduplicated data units 210 stored in the backup storage 218. A backup run can be executed on a scheduled basis or on a request basis. In various embodiments, the backup run could be completed while the primary deduplication engine 302 is running, or while the secondary deduplication engine 304 is running. A specific backup run could involve the primary deduplication engine 302 running the entire time, the secondary deduplication engine 304 running the entire time, the primary deduplication engine 302 running at the start of the backup run and the secondary deduplication engine 304 taking over, the secondary deduplication engine 304 running at the start of the backup run and the primary deduplication engine 302 running later on in the backup run, or any mixture with the primary deduplication engine 302 and the secondary deduplication engine 304 running alternately. The data backup system of FIG. 3 thus has fault tolerance and allows a backup to be completed whether or not the fingerprint database 104 is reliable, and whether or not the first deduplication process fails.

The data backup system of FIG. 3 could be implemented as a variation of the backup system of FIG. 1, by placing the primary deduplication engine 302 and/or the secondary deduplication engine 304 in the server 102, or by coupling the server 102 to either or both of these. The data backup system of FIG. 3 could be implemented as a variation of the backup system of FIG. 2, by placing the primary deduplication engine 302 and/or the secondary deduplication engine 304 in the backup module 214 or in the deduplicating backup module 212. Some of the functionality described herein could be integrated in the deduplication control module 216. The primary deduplication engine 302 or the secondary deduplication engine 304, or both, could operate using pipelining or batches. Other variations are readily devised using the teachings disclosed herein.

Figure 4:
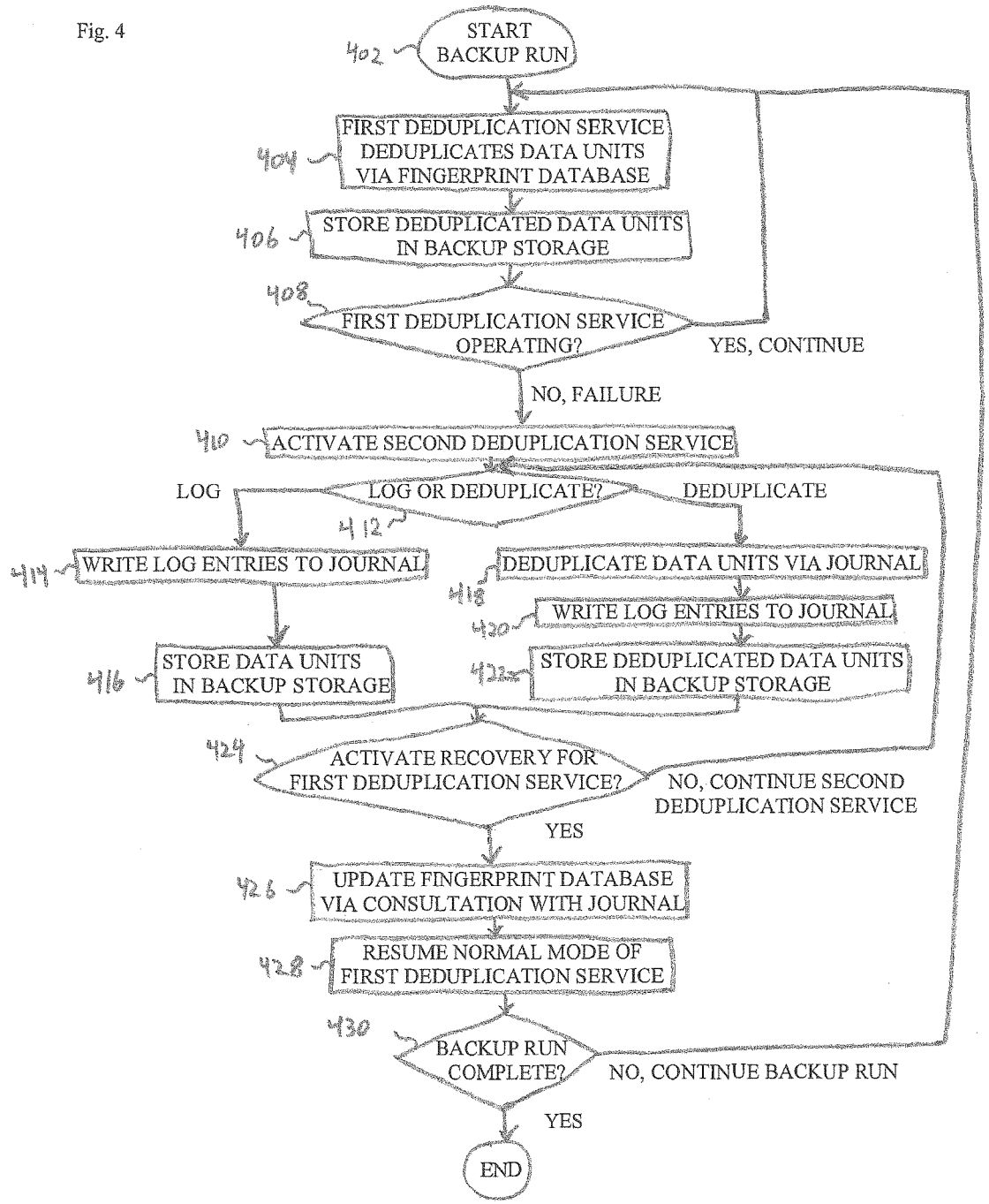
FIG. 4 is a flow diagram of a method of backing up data, which can be practiced on the data backup systems of FIGS. 1, 2 and 3 in accordance with some embodiments.

FIG. 4 shows one embodiment of a method of backing up data. The method can be implemented using a specially programmed processor or computer, and can be practiced on the data backup systems of FIGS. 1, 2 and 3 or variations thereof. The method can be practiced in a single pass, or in one or more loops. The method supports deduplication and backup via a fingerprint database when the fingerprint database is available, and backup even when the fingerprint database is not available, or the first deduplication service is unavailable, e.g., has crashed. A backup operation or run can be performed to completion, once initiated, under conditions of reliable or unreliable access to the fingerprint database, or reliable or unreliable operation of the primary deduplication engine. Descriptions of the actions of the method, and examples of how the actions can be implemented, are provided below.

At the start point 402 of FIG. 4, a backup run is initiated. In one action 404, the first deduplication service deduplicates data units via the fingerprint database. Deduplicated data units are stored in backup storage, in an action 406. For example, the primary deduplication engine can execute the first deduplication service and access and maintain the fingerprint database, as shown in FIG. 3. The primary deduplication engine deduplicates data units, and writes deduplicated data units to the backup storage. In decision action 408 it is determined if the first deduplication service is operating. If the first deduplication service is operating, the flow branches and returns to the action 404 and continues as described above. If the first deduplication service is not operating, i.e., there is or has been a failure of the first deduplication service, the flow proceeds to the action 410 where the second deduplication service is activated in the action 410. Mechanisms for detecting failure of the first deduplication service, and switching over to operation of the second deduplication service are discussed above with regard to FIG. 3. It should be appreciated that these or other readily devised mechanisms could be used to implement the actions 408, 410.

After the second deduplication service is activated, the method proceeds to decision action 412 where it is determined if the second deduplication service should log or deduplicate. In various embodiments, this decision could be made dependent upon situation or implementation, and could be made before or after the second deduplication service is activated. If the second deduplication service is configured to solely log, flow continues with the action 414. If the second deduplication service should deduplicate, the flow continues with the action 418. In the action 414, log entries are written to the journal. For example, the secondary deduplication engine 304 can write entries to the journal, recording a history of operations and writing associated fingerprints to the auxiliary fingerprint database as described with reference to FIG. 3. The method then moves to the action 416, where the data units are stored in the backup storage. For example, the secondary deduplication engine can write data units to the backup storage without deduplication as described in FIG. 3. Flow then continues with the decision action 424.

Picking up the flow of FIG. 4, where it is determined that the second deduplication service should deduplicate in the action 412, the data units are deduplicated via the journal in action 418. Log entries are written to the journal, in an action 420. For example, in some embodiments the secondary deduplication engine deduplicates the data units, writing entries to the log portion of the journal and applying the auxiliary fingerprint database of the journal as discussed above. The secondary deduplication engine looks or searches in the auxiliary fingerprint database for matches to fingerprints of newly arriving data units. In an action 422, the deduplicated data units are stored in the backup storage. For example, the secondary deduplication engine stores the deduplicated data units in the backup storage. Flow then continues with the decision action 424.

The decision action 424 determines if the recovery for the first deduplication service can be activated. If the first deduplication service can not be activated, the second deduplication service should be continued, and the flow branches and joins the decision action 412. For example, the fingerprint database might still be unavailable, or the primary deduplication engine might be failed or otherwise unable to restart for a variety of reasons. In some embodiments, the decision action 412 need not be re-asked, and flow could join either the action 414 for logging or join the action 418 for deduplication in accordance with a previously made decision or implementation. If the first deduplication service can be activated, flow branches to the action 426. In the action 426, the fingerprint database is updated via a consultation with the journal. For example, the primary deduplication engine could access or consult the journal and update the fingerprint database. Fingerprints logged by the secondary deduplication engine, which are not found in the fingerprint database, may be added to the fingerprint database. In some embodiments, the primary deduplication engine could then deduplicate data units that had been stored in the backup storage by the secondary deduplication engine. This deduplication would be part of the process of reconciling the fingerprints in the fingerprint database with the fingerprints in the journal. For example, during a recovery process, the primary deduplication engine can communicate with the journal and look up entries in the log and fingerprints in the auxiliary fingerprint database. These log entries and fingerprints from the journal can then be used by the primary deduplication engine to update the fingerprints in the fingerprint database and update the backup storage as to which of the data units should remain stored therein. This is followed by the action 428, in which normal mode of the first deduplication service is resumed. For example, the secondary deduplication engine can be placed back in idle or deactivated, and the primary deduplication engine can take over the backup process. While idling or in a deactivated state, the secondary deduplication engine or other mechanism or process can monitor the primary deduplication engine to verify correct operation or determine failure.

Flow continues with the decision action 430. In the decision action 430, where it is determined if the backup run complete. If the backup is not complete, the backup run should be continued and the flow branches back to the action 404 so that the first deduplication service can continue deduplicating data units and proceed as described above. For example, the primary deduplication engine can continue deduplicating data units by application of the fingerprint database. If the backup is complete then the method terminates. Determination of when the backup run is complete may be implementation specific. In other embodiments, the check for completion of the backup run could be made at other locations in the flow, or could be arranged so that any loop or other flow operation could be branched out of upon completion of a backup run. These and other ways of completing the process flow are readily determined.

FIG. 5 shows a fingerprint table. Embodiments of the data backup system and embodiments of the method of backing up data can use the fingerprint table or a variation, as described in the following examples. The fingerprint database 104 of FIGS. 1-3 can include a fingerprint table. For each newly arriving fingerprint that does not have a match in the fingerprint database 104, an entry is made in the fingerprint table. The fingerprint is assigned a fingerprint identifier, e.g. a binary, decimal, hexadecimal or other number or alphanumeric identifier, although other systems can be used to assign identifiers. The fingerprint is written into the table, e.g., as a binary number (shown in FIG. 5 with ellipsis to indicate additional bits), an alphanumeric string, a hexadecimal number etc., in a location in the table as associated with the fingerprint identifier. The data unit corresponding to the fingerprint is either assigned an identifier or arrives with an identifier (ellipsis indicates additional digits), and this data unit identifier is also written into the table as associated with the fingerprint. A storage device, e.g., a disk in the backup storage, is identified for storage of the data unit, and the storage identifier of the storage device is written into the fingerprint table. With such a fingerprint table or other searchable data structure, a data unit identified by a fingerprint can be retrieved for restoring data in a system that has experienced a crash. Newly arriving fingerprints can be checked for a match in the fingerprint table. Another fingerprint table can be created, maintained and accessed in the journal of FIG. 3. Newly arriving fingerprints can be logged in the journal via such a fingerprint table. Other types of fingerprint tables or data structures for storing fingerprints in the fingerprint database or the journal are readily devised. It should be appreciated that additional data and tables or other structures to support such data can be added to the fingerprint database and/or the journal. It should be further appreciated that fingerprints could be overwritten when the maximum capacity of the fingerprint table is reached.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for backing up data, comprising:
   deduplicating a first plurality of data units during a backup operation through application of a first deduplication service and a fingerprint database; and
   activating a second deduplication service in response to a failure mode of the first deduplication service to access fingerprint information from the fingerprint database, the second deduplication service including logging a second plurality of non-deduplicated data units in a journal to write fingerprints of the second plurality of non-duplicated data units into the journal during activation of the second deduplication service to form an auxiliary fingerprint database;

resuming operation of the first deduplication service in response to a recovery of the first deduplication service from the failure mode and wherein:

the second deduplication service is discontinued in response to the recovery of the first deduplication service from the failure mode;

initiating a recovery mode in response to the recovery in which the fingerprint database is updated with fingerprints from the auxiliary fingerprint database not found in the fingerprint database; and at least one method of operation is executed through a processor.

2. The method of claim 1, wherein the failure mode comprises the fingerprint database being unavailable and the second deduplication service is operable while the fingerprint database of the first deduplication service is unavailable.

3. The method of claim 1, further comprising:
deduplicating the second plurality of non-deduplicated data units, via application of the second deduplication service and the journal.

4. The method of claim 1, further comprising:
storing the second plurality of non-deduplicated data units in a backup storage, wherein the second plurality of non-deduplicated data units are non-deduplicated.

5. The method of claim 1, further comprising:
storing the second plurality of non-deduplicated data units in a backup storage, wherein the second plurality of non-deduplicated data units is deduplicated via application of the second deduplication service and the journal.

6. The method of claim 1, further comprising:
updating the fingerprint database, in the recovery mode, based upon log entries in the journal, the log entries being made as a result of logging the second plurality of non-deduplicated data units, the updating occurring responsive to the first deduplication service recovering from the failed mode to control the backup operation.

7. The method of claim 1, further comprising:
processing the journal upon a resumption of the first deduplication service; and
adding fingerprints from the journal, which have no match in the fingerprint database, to the fingerprint database, as a result of the processing the journal.

8. The method of claim 1, further comprising:
deleting redundant data units in a backup storage, as found through a processing of the journal, in a recovery of the first deduplication service.

9. A non-transient, tangible, computer-readable media having instructions thereupon which, when executed by a processor, cause the processor to:

derive, during a backup process, a first plurality of deduplicated data units from a first plurality of data units via a first deduplication process having a communication interface with a fingerprint database;

store the first plurality of deduplicated data units in a backup storage, during the backup operation;

store a second plurality of non-deduplicated data units in the backup storage during the backup operation, in response to a failure of the first deduplication process; and store in a journal a history of storing the second plurality of non-deduplicated data units in the backup storage when a second deduplication process is active in which the history stored in the journal includes fingerprints of the second plurality of non-deduplicated data units that are organized into an auxiliary fingerprint database and, wherein storing the history of storing the second plurality of non-deduplicated data units is performed through application of the second deduplication process in response to the failure of the first deduplication process;

resume operation of the first deduplication service in response to a recovery of the first deduplication service from the failure mode; and initiate a recovery mode in response to the recovery in which the fingerprint database is updated with fingerprints from the auxiliary fingerprint database not found in the fingerprint database.

10. The non-transient, tangible, computer-readable media of claim 9, wherein the instructions further cause the processor to:

derive the second plurality of non-deduplicated data units from a third plurality of data units via a second deduplication process and an auxiliary fingerprint database, during the backup operation, wherein the journal includes the auxiliary fingerprint database.

11. The non-transient, tangible, computer-readable media of claim 9, wherein the instructions further cause the processor to:

write first unmatched fingerprints of the first plurality of data units into the fingerprint database, wherein the first unmatched fingerprints are not matched in the fingerprint database;

add fingerprints from the journal to the fingerprint database, during a recovery of the first deduplication process, wherein the fingerprints added from the journal are not matched in the fingerprint database; and execute the first deduplication process in a normal mode after the recovery of the first deduplication process.

12. A data backup system, comprising:
a backup storage;
a fingerprint database;
a first deduplication engine configured to execute a first deduplication process, the first deduplication process deduplicating first data units via comparison of fingerprints of the first data units to fingerprints in the fingerprint database, the first deduplication engine storing deduplicated first data units in the backup storage;
a journal;
a second deduplication engine configured to execute a second deduplication process, the second deduplication process storing second non-deduplicated data units in the backup storage, the second deduplication process logging fingerprints of the second non-deduplicated data units into the journal when the second deduplication engine is activated to form an auxiliary fingerprint database, the second deduplication process is idle while the first deduplication process deduplicates, the second deduplication process is active in storing data units during a condition of failure of the first deduplication process to deduplicate; and
wherein the first deduplication engine has a normal mode in which the first deduplication process is activated and a recovery mode in which the fingerprint database and the backup storage are updated utilizing the journal.

13. The data backup system of claim 12, wherein:
the first deduplication engine is further configured to deduplicate the second non-deduplicated data units;
the second non-deduplicated data units are stored in the backup storage as non-deduplicated data units prior to deduplication by the first deduplication engine; and
the second non-deduplicated data units are stored in the backup storage as deduplicated data units after deduplication by the first deduplication engine.

14. The data backup system of claim 12, wherein the second deduplication process being idle includes one from a set consisting of:
the second deduplication process polling the first deduplication engine to determine whether the condition of failure of the first deduplication process is true or false;
the second deduplication process being deactivated unless the first deduplication process fails a heartbeat check;
the first deduplication process and the second deduplication process being on separate threads in a multi-threaded system, with the second deduplication process monitoring a first deduplication process thread;
the second deduplication process being activated by an interrupt, the interrupt issued upon the failure of the first deduplication process; and
the first deduplication process regularly resetting a timeout timer, the second deduplication process monitoring the timeout timer.

15. The data backup system of claim 12, wherein the condition of failure of the first deduplication process to deduplicate includes one from a set consisting of:
the fingerprint database being unavailable;
the first deduplication process crashing;
the first deduplication engine ceasing operation;
a backup operation, under direction of the first deduplication engine, halting; and
corruption of the fingerprint database.

16. The data backup system of claim 12, wherein:
the journal includes a log and the auxiliary fingerprint database; and
the second deduplication engine is configured to write a history of operation to the log and to write the fingerprints of the second data units to the auxiliary fingerprint database.

17. The data backup system of claim 12, wherein the first deduplication engine is configured to:
look up journal entries in the journal after going back online following a failure of the first deduplication engine; and
update the fingerprint database, via application of the journal entries.

* * * * *